United States Patent [19]

Baghdady

[11] Patent Number: 5,457,708
[45] Date of Patent: Oct. 10, 1995

[54] METHOD AND APPARATUS FOR SIGNAL MODULATION AND DETECTION

[76] Inventor: Elie J. Baghdady, 190 North Ave., Weston, Mass. 02193

[21] Appl. No.: 92,900

[22] Filed: Jul. 19, 1993

Related U.S. Application Data

[62] Division of Ser. No. 767,886, Sep. 30, 1991, Pat. No. 5,264,857, which is a division of Ser. No. 437,743, Nov. 17, 1989, Pat. No. 5,075,695, which is a division of Ser. No. 106,126, Oct. 8, 1987, Pat. No. 4,920,348.

[51] Int. Cl.$^6$ .................................................. H04L 27/10
[52] U.S. Cl. .................................... 375/272; 375/273
[58] Field of Search ............................. 375/45, 62, 46, 375/43; 455/44, 109, 46; 342/433

[56] References Cited

U.S. PATENT DOCUMENTS

| | | | |
|---|---|---|---|
| 3,441,900 | 4/1969 | Ulstad et al. | 340/5 |
| 3,922,685 | 11/1975 | Opas | 343/853 |
| 4,060,809 | 11/1977 | Baghdady | 343/112 |
| 4,088,955 | 5/1978 | Baghdady | 325/56 |
| 4,106,023 | 8/1978 | Baghdady | 343/106 |
| 4,123,759 | 10/1978 | Hines et al. | 343/854 |
| 4,203,113 | 5/1980 | Baghdady | 343/14 |
| 4,328,591 | 5/1982 | Baghdady | 455/303 |
| 4,920,348 | 4/1990 | Baghdady | 342/433 |
| 5,075,695 | 12/1991 | Baghdady | 342/433 |

FOREIGN PATENT DOCUMENTS

| | | | |
|---|---|---|---|
| 72023 | 3/1960 | France | 342/433 |

OTHER PUBLICATIONS

Electrical Engineer's Handbook, "Electric Communication and Electronics", (4th Ed.), pp. 6–72 through 6–75.
Feeding and Phasing Systems, "Beam Steering of Planar Phased Arrays", pp. 219–221.
Proceedings of the IEEE, vol. 56, No. 11, Nov. 1968, "Phased-Array Beam Steering by Multiplex Sampling", by Major A. Johnson, pp. 247–257.
"Properties of Phase Arrays", by Wilhelm H. Von Aulock, pp. 37–49.
The Bell System Technical Journal, vol. XLVI, No. 7, Sep., 1967, "Some Properties and Limitations of Electronically Steerable Phased Array Antennas", by D. Varon and G. I. Zysman, pp. 163–188.
Proceedings of the IEEE, vol. 56, No. 11, Nov. 1968 "A Generalized Approach to the Analysis of Infinite Planar Array Antennas" by Bliss L. Diamond, pp. 69–83.
"Introduction to Communication Systems", Stremler, pp. 244–246, 1977.

Primary Examiner—Stephen Chin
Assistant Examiner—T. Ghebretinsae
Attorney, Agent, or Firm—Burns, Doane, Swecker and Mathis

[57] ABSTRACT

The disclosure relates to methods and apparatus for separating radio signals arriving from different directions and for multiplexing signals intended for receivers dispersed in different directions. The methods and apparatus employ a plurality of antennas with spacing and individual feedline characteristics designed so that a modulation is imparted to each of a plurality of incident signals, for receiving antennas, and radiated signals for transmitting antennas, the modulation level of each signal being determined by the direction of propagation of the signal and by the spacing between antenna pairs. Accordingly, the orientation of lines connecting pairs of antennas as well as the spacing between antennas are set to inhibit the modulation in a particular direction, or to strip a particular modulation off a signal incident from a selected direction.

8 Claims, 11 Drawing Sheets

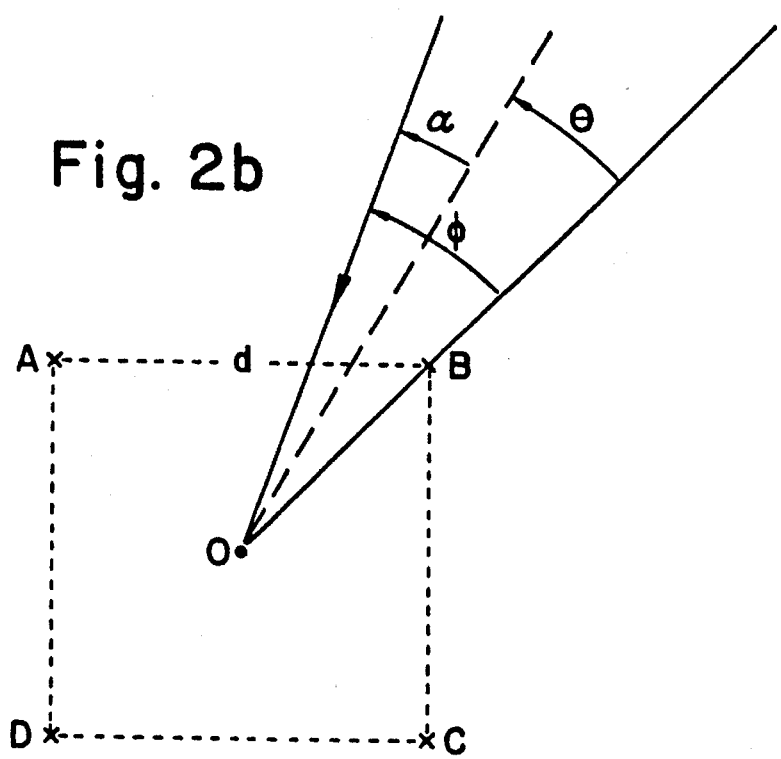

METHOD AND APPARATUS FOR SIGNAL MODULATION AND DETECTION

This application is a divisional of application Ser. No. 07/767,886 filed on Sep. 30, 1991, now U.S. Pat. No. 5,264,857 dated Nov. 23, 1993 which is a divisional of application Ser. No. 07/437,743 filed on Nov. 17, 1989, now U.S. Pat. No. 5,075,695 dated Dec. 24, 1991 which is a divisional of applicaton Ser. No. 07/106,126, filed on Oct. 8, 1987, now U.S. Pat. No. 4,920,348 dated Apr. 24, 1990.

BACKGROUND OF THE INVENTION

This disclosure relates to methods and apparatus useful for discriminating between signals on the basis of the spatial orientations of the normals to their traveling wavefronts. Since the methods and devices disclosed herein may operate on signals that need differ only in the directions of propagation of their wavefronts, and may otherwise be of arbitrary relative strengths, waveforms, spectral or modulation characteristics, these methods and devices are particularly adapted to separate mutually interfering signals, as in multipath transmission, multitarget radar returns, electromagnetic jamming, and multiplex transmission.

Prior art techniques for discrimination between signals on the basis of the directions of arrival or of departure of their wavefronts are based on antenna pattern synthesis by aperture design or/and combining the simultaneous outputs of separate antennas in such ways as, in effect, to create directional mainlobes or/and directional nulls. Those prior techniques, while proven effective and often affordable for directions that differ by several degrees or more, they tend to become generally prohibitively costly when designed to resolve smaller directional differences, and when designed to adapt to changes in directions of wavefronts or/and to more than a few simultaneous wavefronts. These remarks are particularly applicable to operating frequencies in the lower microwave and below bands.

The techniques disclosed herein provide a means for discriminating between signals differing in the directions of propagation of their wavefronts by imposing on each signal a modulation that depends, in modulation level and/or modulation phase or time reference, upon the relative orientation of the normal to the signal wavefront. It is well-known from basic modulation theory that modulation of a carrier always results in a redistribution of a fixed amount of signal power over a frequency spectrum that is always wider than the original signal or carrier spectrum width, thus reducing the signal power density within that original bandwidth. Accordingly, with each signal thus modulated with a modulation level proportional to the direction cosine of its wavefront, the power spectral densities of the differently directed signals will be reduced within their original bands in amount determined by the square of the respective direction cosine. The discrimination between signals could then be based on which signal has its power spectral density within a specified band reduced more or less than which.

Accordingly, it is an object of the present invention to provide a spectrum spreading technique which diverts a portion of the signal power or energy from within the original signal bandwidth to outside of that bandwidth, the proportion thus diverted being dependent on the square of the direction cosine of the nodal to the signal wavefront.

It is another object of the present invention to provide a means for distinguishing between signals by causing each to have a fraction of its power or energy, determined by the direction cosine of its wavefront, to be diverted into a more widely spread frequency range.

It is yet another object of this invention to provide a technique for causing a fraction of a signal's power, dependent on the direction cosine of its path ray, to be diverted into a new component signal whose carrier reference is of the same frequency as the original carrier reference but is orthogonally phased relative to the original carrier reference, and whose power or energy spectral density is spread out over a wider frequency range than the original signal.

It is yet another object of this invention to provide a means for separating two signals arriving from, or radiated to, different directions by causing none of the power or energy of one to be dispersed outside of its original bandwidth, while at the same time causing all of the power or energy of the other to be diverted to a spectrally spread replica of the original signal extending over a bandwidth wider than that of the original signal.

It is yet another object of this invention to provide a means for multiplexing signals on the basis of the relative directions of the normals to their wavefronts, which may be referred to as direction-division multiplexing.

It is yet another object of this invention to provide a means for demultiplexing signals on the basis of the relative directions of the normals to their wavefronts, which may be referred to as direction-division demultiplexing.

It is yet another object of this invention to provide a method for picking up signals or radiating them that causes a digital modulation to be imparted to some parameter (e.g., amplitude, phase, frequency or polarization) of each signal, such that the modulated parameter shift due to said imparted modulation is determined primarily by the direction cisine of the signal wavefront.

It is yet another object of this invention to provide a method for picking up signals or radiating them that causes an analog modulation to be imparted to some parameter (e.g., amplitude, phase, frequency or polarization) of each signal, such that the modulated parameter deviation due to said imparted modulation is determined primarily by the direction sine of the signal wavefront.

It is yet another object of the present invention to provide a means for radiating or receiving time-shifted replicas of the same digitally code-modulated signal such that these replicas combine in perfect coincidence in time or phase in only one particular radial direction and noncoincidence in all other radial directions.

These and other objects and features of this invention will become apparent from the claims, and from the following description when read in conjunction with the accompanying drawings.

BRIEF DESCRIPTION OF THE DRAWINGS

FIGS. 2 (a), (b) and (c) are a schematic illustration of two ways of arranging four antennas for implementing corresponding embodiments of the present invention employing hopping between four spaced antennas in order to modulate a signal in a manner useful for discriminating between signals on the basis of the spatial orientations of the normals to their traveling wavefronts.

DETAILED DESCRIPTION

The present invention relates to both transmitting and receiving systems and methods for imparting to an outgoing signal or to an incident signal a modulation whose measure depends on the radial direction along which its wavefront is traced out of the transmitter or is incident on a receiver. Although primary emphasis is placed herein on inducing direction-dependent modulation of a signal to effect direction-dependent reduction of its spectral density within its original bandwidth for the purpose of reducing mutual interference between signals overlapping in time-frequency plane, but having different directions, the methods for achieving this may also be used to reduce signal detectability in all directions save within a selectable narrow solid angle, to enhance system anti-jam processing gain, to reduce if not altogether eliminate the effects of multipath propagation, to separate multipath signals and to multiplex and demultiplex signals on the basis of different directions of propagation.

In one method of implementation for carrying out the intent of the present invention, two or more physically separated antennas are employed with their terminals connected to a single output or input through a single-pole multiple-throw switch. The switch position connecting the "single-pole" to one of the various "throws" is then controlled so as to move its "throw" point from the terminals of one of the antennas to those of the other. This process will be called antenna hopping if the transition of the connection from one antenna to the next is performed in a manner that is effectively abrupt; i.e., with no significant time difference between completely disconnecting one antenna and completely connecting the next. It will be referred to as antenna commutation if the transition is performed gradually; i.e., with a significant time difference between disconnection of one antenna and connection of the next.

Figure 1A:
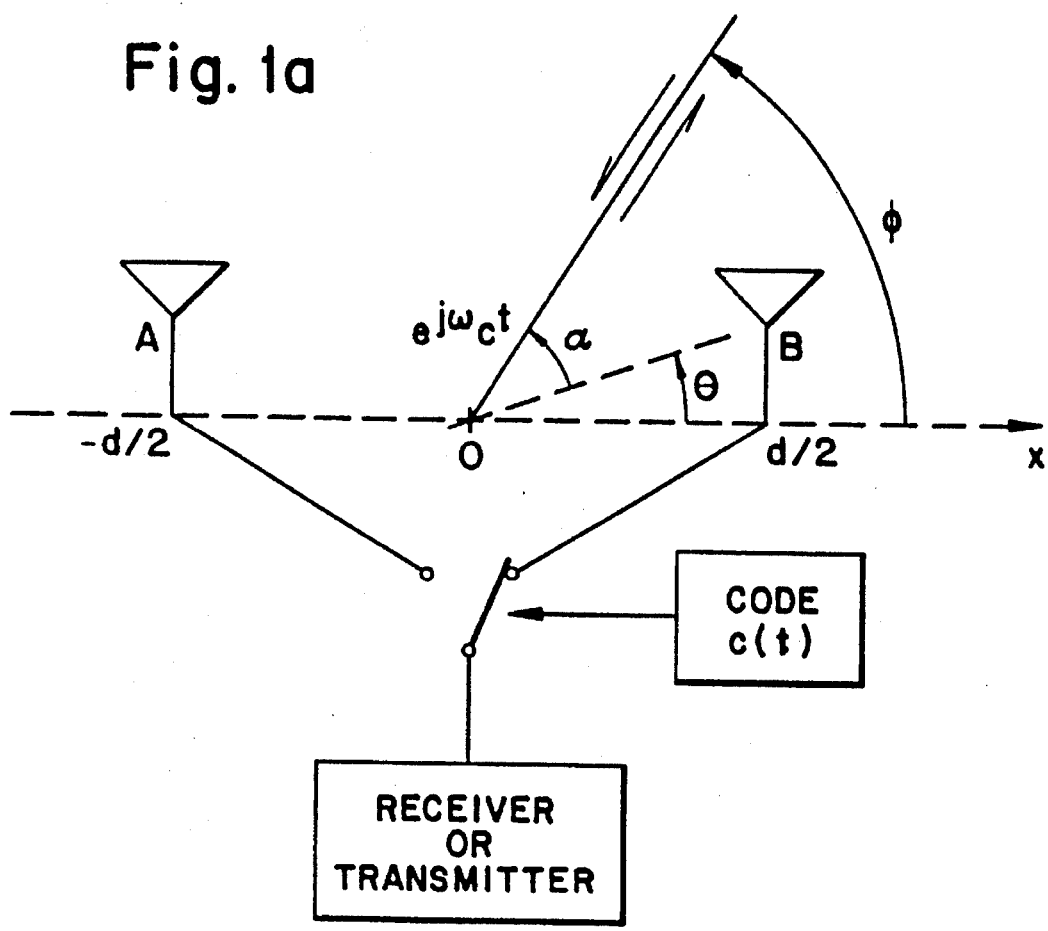
FIGS. 1 (a) and (b) are a schematic illustration of an embodiment of the present invention employing hopping between two separated antennas for modulating either an incident signal or a radiated signal in a manner useful for discriminating between signals on the basis of the spatial orientations of the normals to their traveling wavefronts.
Figure 1B:
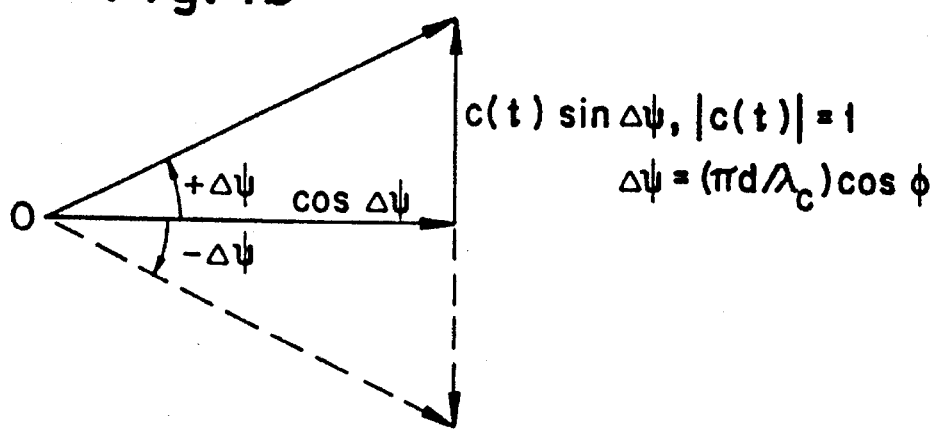
Figure 3:
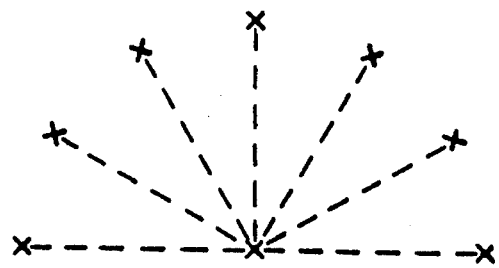
FIG. 3 is a schematic illustration of one way of arranging a plurality of antennas for implementing embodiments of the present invention wherein the orientation of the line through a pair of hopped positions is varied, but the distance separating them is held fixed.
Figure 4A:
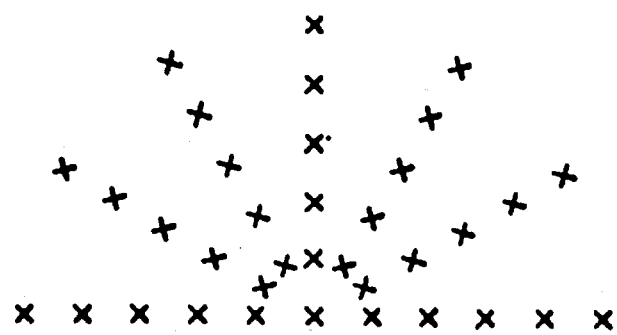
FIGS. 4 a) and b) are schematic illustrations of ways of arranging a plurality of antennas for implementing embodiments of the present invention wherein both the orientation of the line through and the separation between pairs of hopped positions can be varied.
Figure 4B:
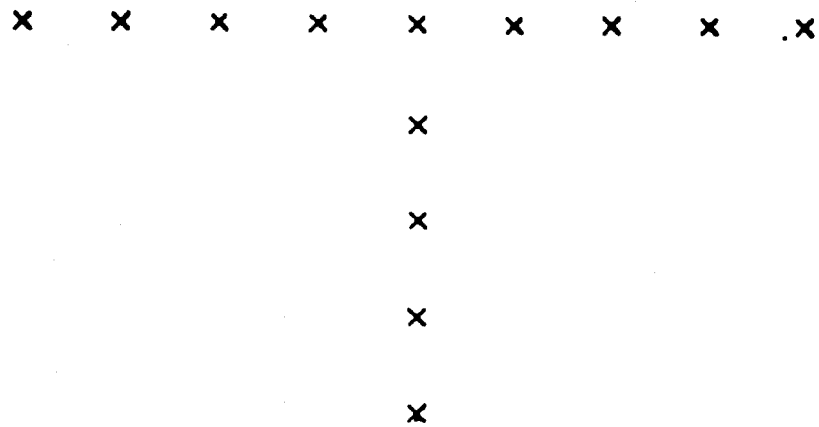

The simplest antenna hopping arrangement is illustrated in FIG. 1. Two antennas (A,B) are positioned at $x=\pm d/2$. A plane wavefront representing an unmodulated sinusoidal carrier $\exp j\omega^c t$ is incident at radial angle $\phi$ relative to the line connecting the two antennas. The phase as sensed at the midpoint, $x=0$, is taken as reference. The signal as sensed at $x=d/2$ is then represented by $\exp j(\omega_c t - \Delta\psi)$, and at $x=-d/2$ by $\exp j(\omega_c t + \Delta\psi)$, where $$\Delta\psi = \frac{\pi d}{\lambda_c} \cos\phi,$$

and $\lambda_c$ is the incident wavelength. Thus, if the receiver input is switched from the output of one of the antennas to that of the other, the received signal is given by $$e_{rec}(t) = e^{j\psi(t)} \cdot e^{j\omega_c t} \quad (1)$$

where
104 $(t) = +\Delta\psi$ or $-\Delta\psi$, $\Delta\psi = (\pi d/\lambda_c)\cos\phi$
In this way, binary PSK may be applied to the signal in accordance with some code. The applied phase Shift is a maximum of $\pi d/\lambda_c$ rad in the directions $\phi=0$ and $\pi$, and a minimum of 0 rad for $\phi=\pi/2$. For $d=\pi_c/2$, $\Delta\psi=(\pi/2)\cos\phi$, representing phase-reversal modulation in the directions along the line connecting the antennas. Note that
$e^{j\psi(t)} = \cos\Delta\psi \pm j\sin\Delta\psi$
which, as illustrated in FIG. 1(b), shows that the received signal can be decomposed into a carrier reference component of amplitude $\cos\Delta\psi$, and an orthogonally phased phase-reversal modulated component of amplitude $\sin\Delta\psi$.

Now let the antenna hopping be determined by a coded binary sequence $c(t)$ of rectangular pulses, each of unit height, duration $T_b$ sec and positive or negative polarity. The received signal is then represented by $$e^{j\omega_c t} \cdot e^{j\Delta\psi c(t)} = (\cos\Delta\psi)\, e^{j\omega_c t} + (\sin\Delta\psi) c(t)\, e^{j(\omega_c t + \pi/2)} \quad (2)$$

$$= e^{j\omega_c t}, \text{ for } \phi = \pi/2 \quad (3)$$

$$= c(t)\, e^{j(\omega_c t + \pi/2)}, \text{ for } |\Delta\psi| = (\pi d/\lambda_c)|\cos\phi| \quad (4)$$
$$= \text{(odd integer)}\pi/2$$

This shows that binary antenna hopping according to the code waveform c(t) diverts power from $e^{j\omega_c t}$ to $c(t)e^{j(\omega_c t + \pi/2)}$ by a percentage given by $100\sin^2\{(\pi d/\lambda_c)\cos\phi\}$, spreading this diverted percentage of the total power in accordance with the spectral density of the code waveform c(t). The percentage of the total signal power spread over frequency in this manner is determined, for a given separation $d/\lambda_c$ of antennas, by the direction cosine, $\cos\phi$, of the wavefront relative to the line connecting the two antennas. None of the power in $e^{j\omega_c t}$ is spread out in this manner for $\phi=\pi/2$, and all of it is spread out for direction cosines satisfying Eq. (4), this latter implying phase steps of $\pm\pi/2$ or odd multiples thereof.

Equation (4) also shows that the separation between antennas provides a means for ensuring that the whole power of an undesired signal is diverted to a spectrally spread form for whatever the angle of arrival, $\phi$, happens to be. This may be done by a) Actually moving the two antennas apart to the separation that results in the full diversion b) Having several antennas in a row, and switching between the first and another spaced close to the required separation.

Thus, the line connecting two antennas can be oriented so that it is orthogonal to the direction of arrival of a desired signal to ensure that none of its power is diverted by the antenna hopping, and, simultaneously, the separation between the two hopped antennas can be adjusted so that Eq.(4) is satisfied for the direction of arrival of an undesired signal.

M'ary PSK can be applied to a signal by antenna hopping among M different positions. Simple illustrative arrangements are shown in FIGS. 2 a) and b), 3 and 4.

Consider, for example, the arrangement of four antennas at the corners of a square, as illustrated in FIG. 2 (b). Here, with the phase. reference taken at the center point, O, the signal there is represented by $e^{j\omega_c t}$. At the four corners, with s(t) representing sensed signal, $$S_A(t) = e^{j\sqrt{2}\,\pi(d/\lambda_c)\cos\alpha\sin\theta} \cdot e^{j\omega_c t}$$

$$S_B(t) = e^{-j\sqrt{2}\,\pi(d/\lambda_c)\cos\alpha\sin\theta} \cdot e^{j\omega_c t}$$

$$S_C(t) = e^{-j\sqrt{2}\,\pi(d/\lambda_c)\cos\alpha\sin\theta} \cdot e^{j\omega_c t}$$

$$S_D(t) = e^{j\sqrt{2}\,\pi(d/\lambda_c)\cos\alpha\sin\theta} \cdot e^{j\omega_c t}$$

The hopping possibilities are indicated in FIG. 2 (c).

The antenna positions, of course, need not fall into regular formations, but could be preplanned for arbitrary patterns and spacings, fixed or adjustable, to satisfy particular designs.

One may also start by forming alternative combinations of outputs of spaced antennas, and then hop among these combinations. For a simple, useful example, the pairwise differences between outputs of spaced antennas have direction-dependent amplitudes. Specifically, the difference between the outputs of the two antennas of FIG. 1 in response to an incident signal wave represented by $\cos\omega^c t$ is represented by $\cos\alpha\sin\{\pi(d/\lambda_c)\cos\phi\}\sin\omega_c t$. Thus, direction-dependent amplitude-shift keying (abbreviated, ASK) results from hopping among the differences between the outputs of such pairs of antennas.

Antenna hopping as described thus far is characterized by the condition of zero transition time between antennas. It is clearly a process of impulse sampling of antenna position—and hence phase shift due to propagation delay—followed by zero-order hold. The result is PSK, in antenna position to antenna position hopping, and ASK in hopping between differences in signals received at different positions.

Introducing a nonzero transition time between antennas and building frequency selectivity into the tap connectors/ feeds provide potent means to shape profoundly the outcome of antenna switching. Effective frequency selectivity is quite readily introduced by shaping the gate (or window, or blending) time function for activating and deactivating each antenna position. Accordingly, another method of implementation for accomplishing the intent of this invention is to employ a single-pole, multiple-throw switch that is controlled so as to commutate the single-pole through the various throw positions, taking nonzero time to transit from one throw position to the next to simulate a single antenna in actual motion with finite speed.

Taking nonzero time to transit from one throw position of the switch to the next is equivqlent to having the throw positions activated all the time, and connected to the spaced antenna locations, and then making one antenna commute at finite speed between and through the spaced locations, where it becomes activated and deactivated in the manner defined for each live throw position by a sampling gate function in the transmit mode, and impulsively in the receive mode. Antenna motion relative to a wavefront induces a Doppler frequency shift on a signal received, or a signal conveyed by a radiated traveling wave. Variation, or modulation, of the antenna velocity vector results in modulation of the Doppler frequency shift. The resulting Doppler-shift modulation will depend on the direction cosine of the antenna velocity vector relative to the normal to the incident, or emitted, wavefront, and on the time variation of the magnitude of the relative velocity vector. We call such induced Doppler-shift modulation "induced directional frequency modulation," or IDFM. The curve connecting the antenna positions traced in sequence by the commutator is called generally the "path of motion," or POM, and in special cases the "circle of motion," or COM, and the "line of motion," or LOM. The methods of the present invention relating to IDFM extend the IDFM concept of Applicant's U.S.Pat. No. 4,088,955 to situations in which the time-dependence characteristics of the IDFM must be tailored to the requirements of one or another of the objects stated above under

BACKGROUND OF THE INVENTION

A direct application of the well-known sampling theorem shows that if three or more antennas are spaced closer than one-half of a wavelength of the signal, and are commutated through a sampling window function occupying an area of less than 3 in the time-frequency plane, then the result of the commutation will be very nearly equivalent to the output of one antenna moving continuously between and through the repetitively commutated, discrete, fixed antenna positions.

As in the case of abrupt-hopping-and-hold antenna switching, blended commutation that satisfies the conditions for equivalence to a single moving antenna results in multiplying an emitted or incident sinusoidal carrier, represented by $e^{j\omega_c t}$, by a phase-modulating factor $e^{j\psi(t)}$ where $\psi(t)$ describes the variation of the phase of $e^{j\omega_c t}$ with motion along the antenna POM. The IDFM resulting from this motion is represented by $\psi(t)$.

Specific illustrations of practical interest include, but are not restricted to, the following:

i) Traversing a rectilinear LOM in one direction at constant speed, with abrupt return from the last position on the LOM to the first, which results in $$\omega(t) = \{2\pi f_m(D/\lambda_c)\cos\phi\}t, \ 0 \leq t \leq 1/f_m, \text{ mod } 1/f_m$$

This represents sawtooth phase modulation, effecting a constant frequency shift of $2\pi f_m(D/\lambda_c)\cos\phi$ during each traversal of the LOM.

ii) Traversing a rectilinear LOM in alternating directions at the same constant forward and return speed, which results in squarewave FM, with $$\psi(t) = \{2\pi \cdot 2f_m(D/\lambda_c)\cos\phi\}t \cdot e_{sq}(t),$$

where $e_{sq}(t)$ represents a squarewave of unit amplitude and period $1/f_m$ sec. If $e_{sq}(t)$ is replaced by a code waveform $c(t)$, then binary FSK results if $c(t)$ is binary (some sequence of +1's and −1's). M'ary FSK results if the speed of each traversal of the LOM is selected from a set of M constant values.

iii) Traversing a rectilinear LOM in either direction with constant acceleration. During each such traversal, of duration $T_m$, $$\psi(t) = \{(\Delta\omega)_{max}(1/T_m)\cos\phi\} \cdot t^2/2, \ 0 \leq t \leq T_m$$

This results in linear FM with a direction-dependent slope.

All of the above ways of imparting IDFM to a signal, as well as other ways not restricted to employing rectilinear LOM's or for that matter circular, elliptical or other regular shapes, convert direction of arrival(DOA) difference, when applied at the receiver, and direction of departure (DOD) difference when applied at the emitter, into a frequency difference. Doppler-shift modulation of the form iii), applied at the emitter, converts propagation time difference to frequency difference, and provides a method of spreading the spectrum of a signal, outgoing or incoming, by linear FM (also known as chirp) modulation with a direction-dependent frequency slope, and hence, width of spectral spreading.

Figure 5B:
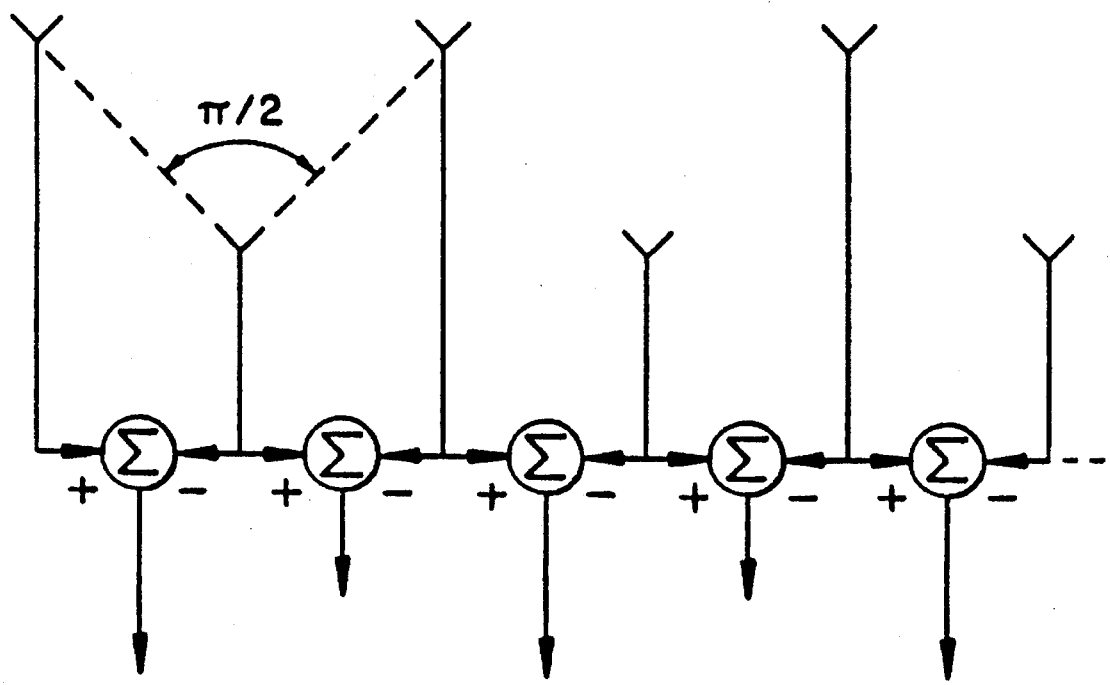
FIGS. 5 (a) and (b) are schematic illustrations representing variations on yet another embodiment of the present invention in which the differences between outputs of pairs of antennas are first derived, and then the switching, commutation or combination is done among said differences in order to modulate a signal in a manner useful for discriminating between signals on the basis of the spatial orientations of the normals to their traveling wavefronts.
Figure 5A:
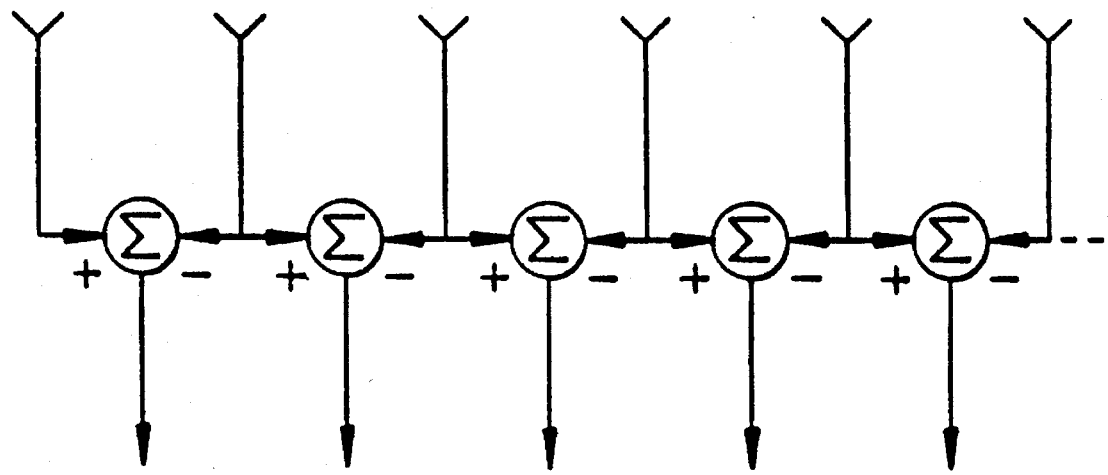

Reference is now made to FIGS. 5 (a) and (b) which are schematic illustrations representing variations on yet another embodiment of the present invention in which the differences between outputs of pairs of antennas are first derived, and then the switching, commutation or a linear combination is effected among said differences. If the separation between pairs of antennas whose outputs are differenced is denoted $s_a$, and $\lambda_c$ is the wavelength of a signal $\cos\omega_c$ incident along a radial at an angle $\phi$ with the line connecting a pair of antennas as shown in FIG. 1, then the difference between the outputs of the pair, if the incident signal at the midpoint between the antennas is described by $\cos\omega_c t$, is represented by $$\cos\alpha \sin\{\pi(s_a/\lambda_c)\cos\phi\}\sin\omega_c t \quad (5)$$

which for $s_a < \lambda_c/4$ can be approximated by $$\cos\alpha\{\pi(s_a/\lambda_c)\cos\phi\}\sin\omega_c t \quad (6)$$

Note that for $(s_a/\lambda_c)\cos\phi = (\text{integer})\pi$ the difference signal (5) vanishes. This indicates a directional null obtainable by setting $$s_a = (\text{integer}) \lambda_c/\cos\phi \quad (7)$$

Figure 8:
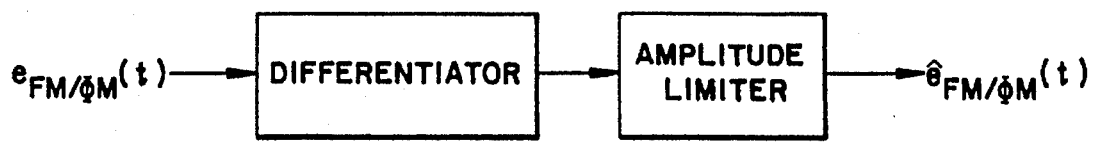
FIG. 8 is a schematic illustration of an exemplary embodiment of the present invention for generating the Hilbert Transform of an FM/ΦM signal wave, $e_{FM/\Phi M}(t)$, by employing a differentiator.
Figure 9:
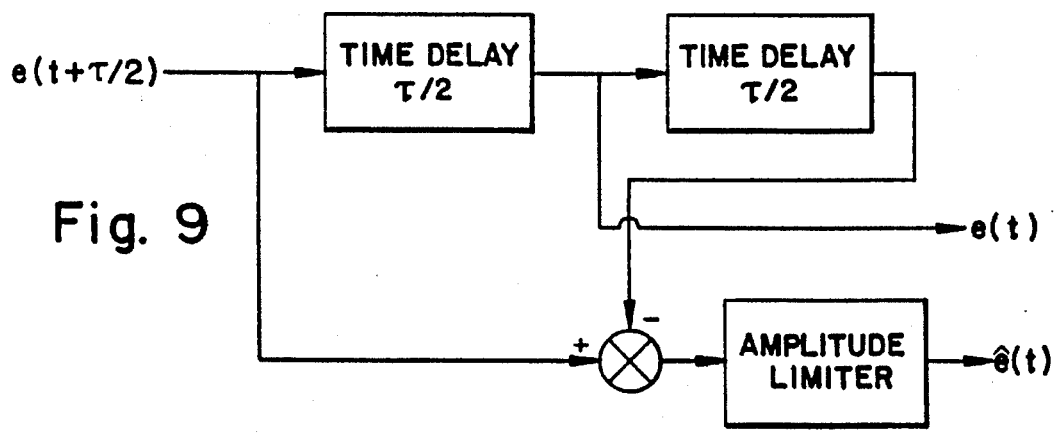
FIG. 9 illustrates an alternate exemplary embodiment of the present invention for generating the Hilbert Transform of an FM/ΦM signal wave, $e(t)$, by employing successive delay devices.
Figure 10:
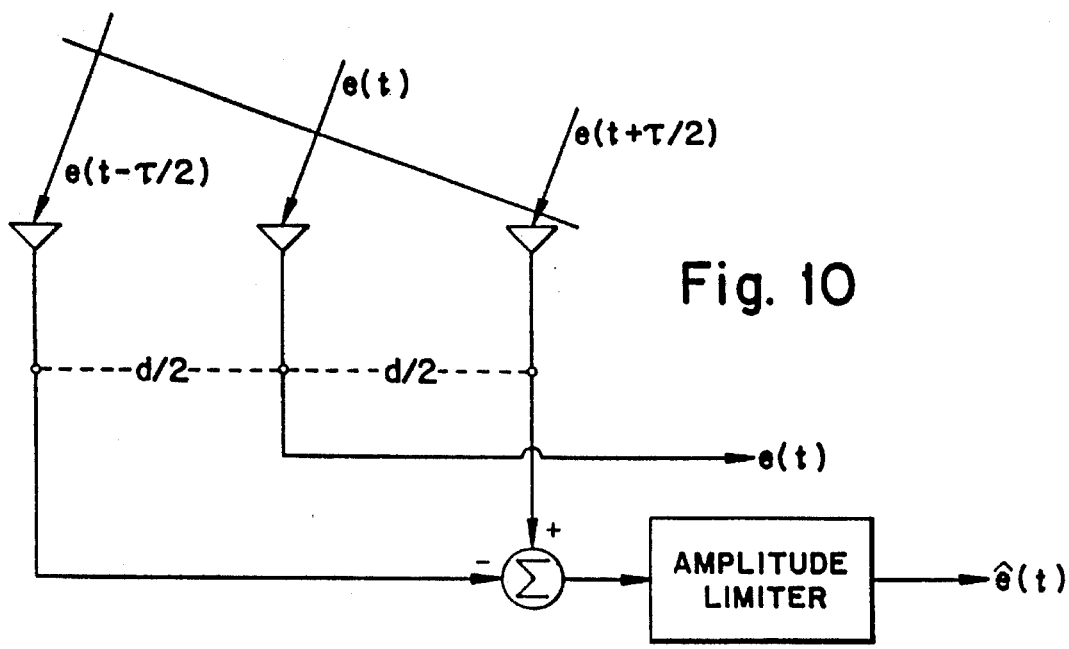
FIG. 10 illustrates yet another exemplary embodiment of the present invention employing spaced antenna elements for generating the Hilbert Transform $ê(t)$ of an FM/ΦM signal wave, $e(t)$, incident at the center antenna element.
Figure 11:
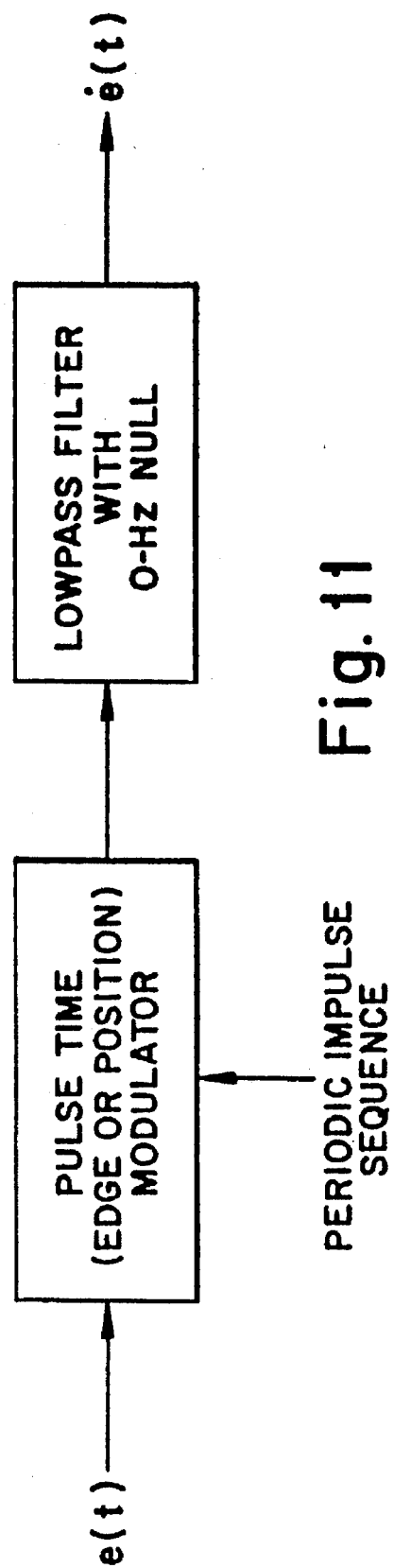
FIG. 11 is a schematic illustration of an exemplary embodiment of the invention employing time position modulation of periodically recurring impulses (very short pulses) as a means for obtaining the time derivative of a waveform, $e(t)$.

In the case where the antennas are all arranged along a straight line, the separations between antennas are all equal, and the blending is effective in suppressing all sampling off-bands, the result of commutation among the difference signals typified by (6) is a signal representable by $$\cos\alpha\{\pi(s_a/\lambda_c)\cos\phi\}\sin\{\omega_c t + \psi(t)\}, \ s_a/\lambda_c < \frac{1}{4} \quad (8)$$

where $\psi(t)$ is the IDFM due to the commutation. The amplitude of the difference signal represented by (6), and of the signal (8) out of the commutation of the various pairwise difference signals, clearly carries the direction cosine of the incident wavefront. Detection of this amplitude thus provides a measure of the direction cosine that can be used to control the orientation of the antenna LOM relative to the incident ray path of a signal. Moreover, the carrier factor in (8) carrying the IDFM is the Hilbert transform of the IDFM carrying signal factor, $\cos\{\omega_c t + \psi(t)\}$, that is obtained from commutating through the individual antenna outputs. Thus, the process leading to equation (8) yields the Hilbert transform of the waveform and can be embodied as illustrated in FIGS. 8, 9 and 10. For example, FIG. 8 shows a differentiator and a means for suppressing amplitude modulation (i.e., an amplitude limiter) for yielding the Hilbert transform. If a small group delay difference $\tau_d$ is introduced between these two IDFM carrying signal factors, then the lowpass filtered(LPF) product of the two yields $$LPF|\sin\{\omega_c t + \psi(t)\}\cos\{\omega_c(t+\tau_d)+\psi(t+\tau_d)\}| \propto \sin\{\omega_c \tau_d + \psi(t+\tau_d) - \psi(t)\} \approx \tau_d\{\omega_c + \dot\psi(t)\} \quad (9)$$

This shows that the IDFM waveform can be extracted by first obtaining the outputs of two blended commutators, one operating on the individual outputs of the set of POM spaced antennas, the other operating on the pairwise differences between the outputs of the antennas, delaying one of said commutator outputs by a small time difference relative to the other, and then multiplying the two and lowpass filtering the result. Exemplary implementations of the process embodied by equation (9) are illustrated more specifically in FIGS. 12 a) and 12 b), 13 and 14.

Figure 12A:
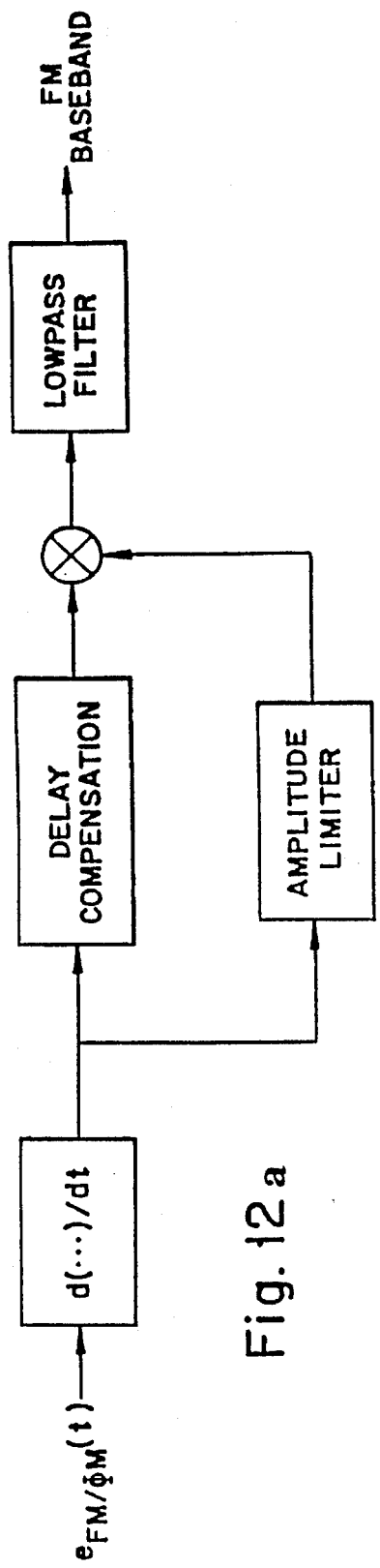
FIGS. 12 a) and 12 b) are schematic illustrations of embodiments of the present invention for demodulating a constant-envelope, frequency-modulated signal.
Figure 12B:
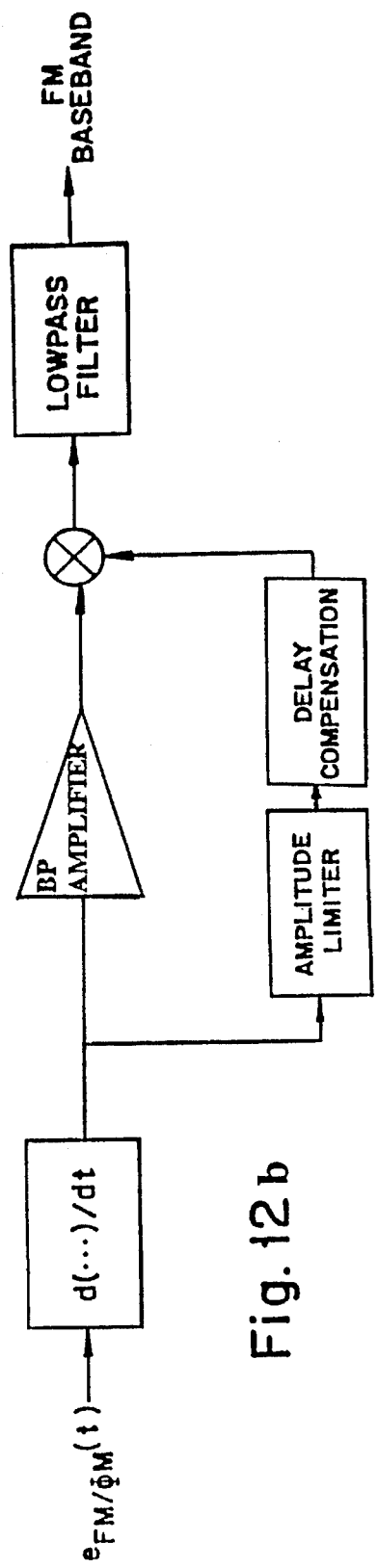

In the implementation of equation (9) as illustrated in FIGS. 12 a) and 12 b), a differentiation block is employed which transforms the input constant-envelope signal into a signal that carries both AM as well as FM on the input signal, the AM being directly proportional to the FM modulation waveform (or FM baseband). The output of the differentiation block is then channelized through two parallel forward paths, one of which passes said output with its AM and FM preserved, and the other suppresses the AM by means of an AMPLITUDE LIMITER. The output of the AMPLITUDE LIMITER can then be employed as an FM-homodyne reference local oscillator signal in the multiplication block. The outputs of the two channels are multiplied, and the resulting product is lowpass-filtered to obtain the result expressed by the final right-hand side of Eq. (9). This coherent-product AM demodulation process can include use of delay compensation to reduce the delay difference between the two parallel forward channels to the small value assumed in Eq. (9).

Figure 13:
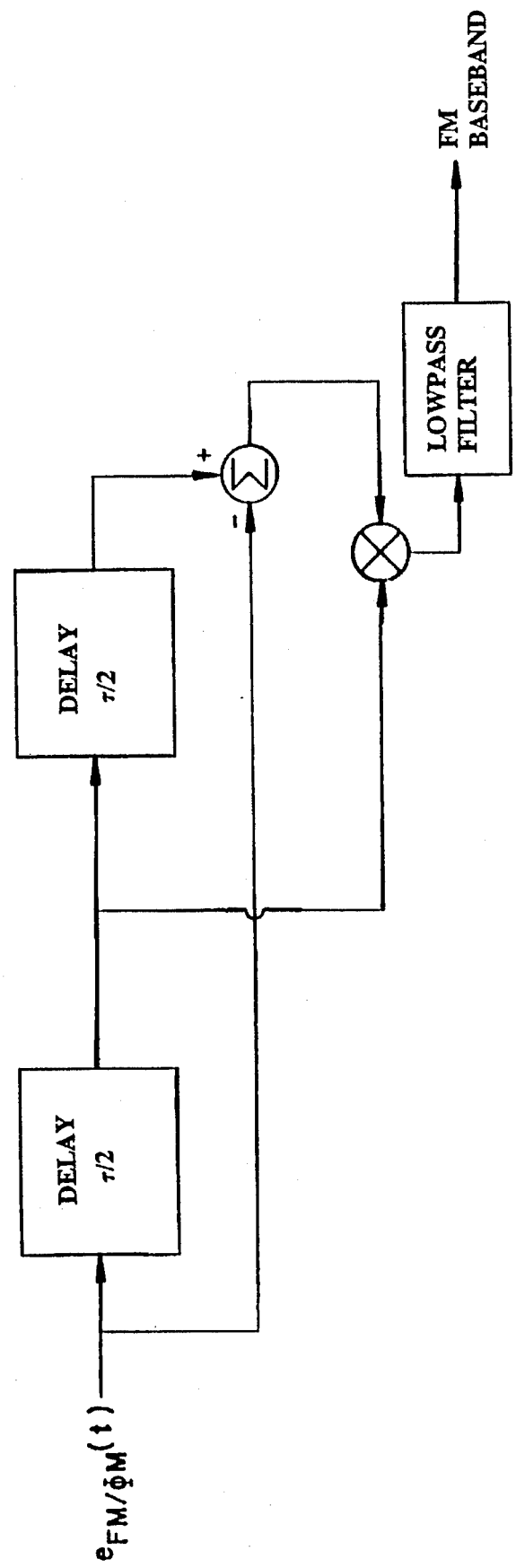
FIG. 13 is a schematic illustration of an alternate exemplary method of demodulating a constant-envelope, frequency-modulated signal according to the present invention, employing successive delay steps.
Figure 14:
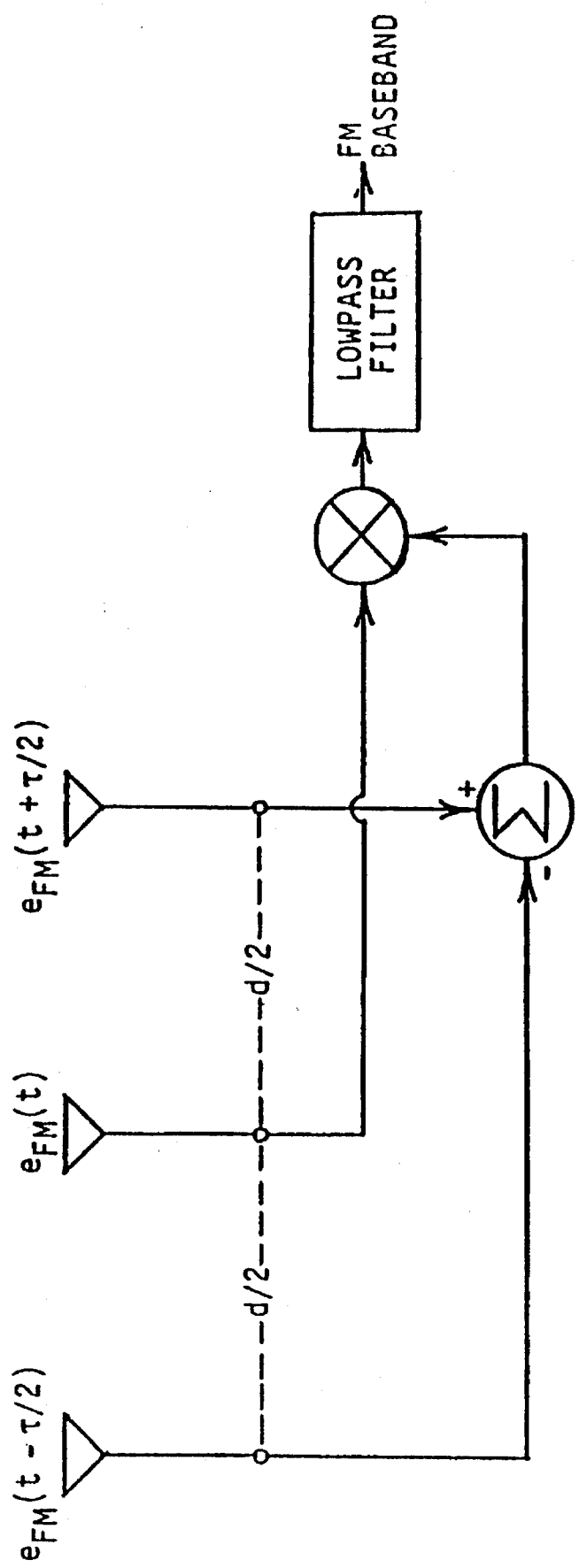
FIG. 14 illustrates yet another exemplary embodiment of the present invention for demodulating a constant-envelope, frequency modulated wave, $e_{FM}(t)$, incident at an antenna element, employing two other antenna elements spaced equally on both sides of said first antenna element.

In the embodiment illustrated in FIG. 13, the differentiation of the input constant-envelope FM signal is approximated by differencing the input signal and a delayed replica of it, and the constant-envelope input signal itself is employed as the FM-homodyne reference local oscillator signal; thus, no amplitude limiter is required. In the embodiment illustrated in FIG. 14, the successive delays introduced in FIG. 13 by means of delay blocks (that ordinarily are implemented by means of group delays in bandpass filters, or propagation delays through connecting cables) are now obtained as spatial propagation delay differences between spaced intercepting antenna elements.

The direction-dependent propagation time between spaced antennas can be exploited in yet another manner: With appropriate premodulation, a signal can be radiated so that its energy is "focused" within a well-defined solid angle, and effectively "defocused" outside of it. The schematic of FIG. 6 illustrates an embodiment for accomplishing this by the method of synthesizing desired signal characteristics of this disclosure, wherein each of a set of spaced antennas is continuously connected to the signal source, or to a receiver.

Figure 6:
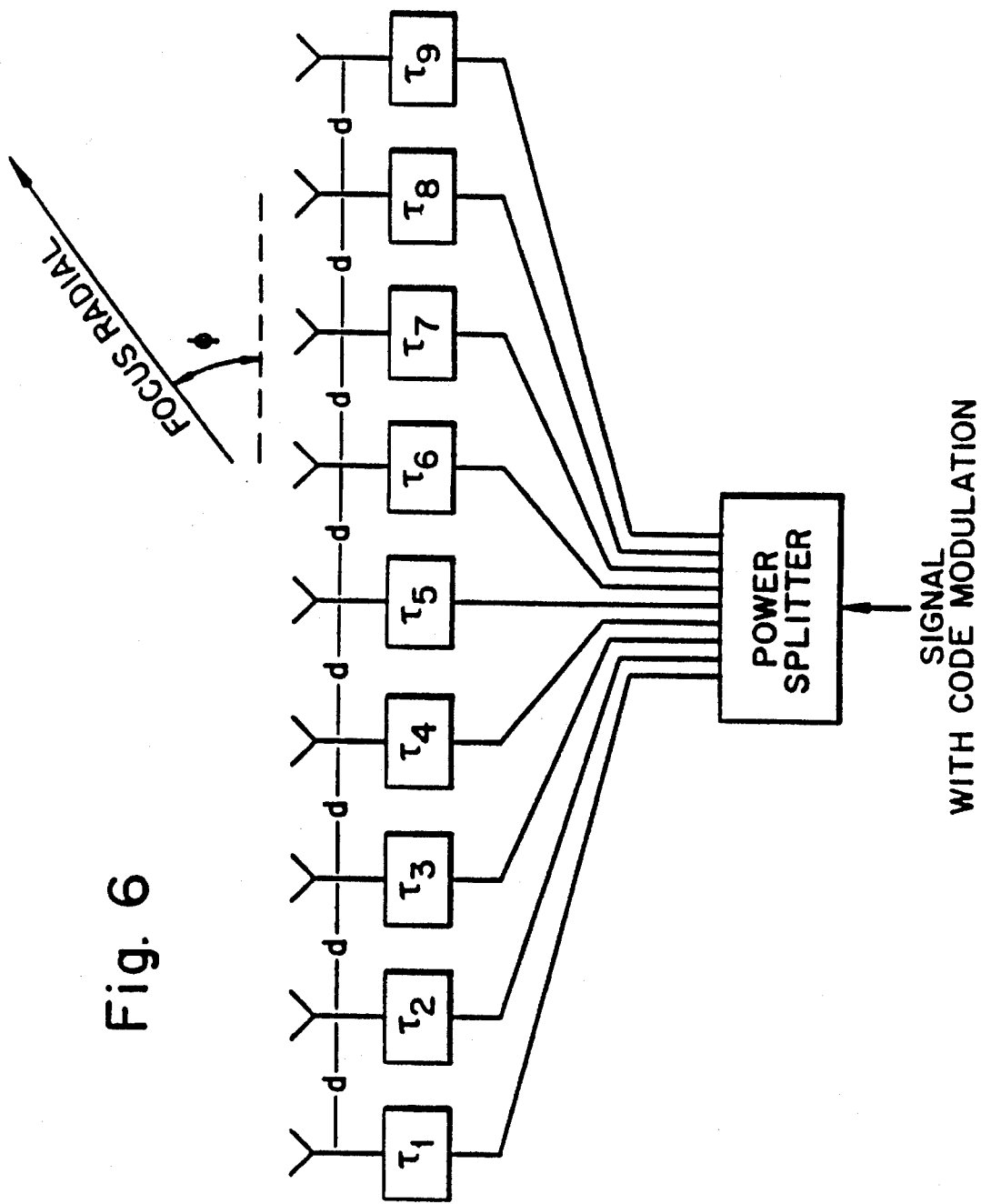
FIG. 6 is a schematic illustration of yet another embodiment of the present invention in which a set of spaced antennas is used in conjunction with feedlines incorporating adjustable or controllable gains, delays and phase shifts as a means to cause a signal to acquire characteristics that make it appear to be different along differently oriented radials.

With reference to FIG. 6, let the signal carry a modulation in part by a waveform characterized by an autocorrelation function with a very narrow mainlobe and very low sidelobes. If this signal is radiated simultaneously by the set of spaced antennas, the resultant signal along any radial will be the sum of replicas of the original signal, each emitted by one of the antennas in the set. The spacing between antennas and/or the orientation of the line (if such) along which they are positioned may then be set so that the various signal replicas in the far field add up with perfect alignment in modulation time/phase along a particular radial. We call this signal focusing along said particular radial. Outside of a narrow solid angle (or cone) centered about the radial of perfect modulation time/phase alignment, the various replicas of the signal will add up with their modulations misaligned sufficiently to be in disarray, causing their resultant to be not so well detectable. We call this signal defocusing. The direction of perfect focusing can be steered by introducing delay differences in the antennae feedlines to directly compensate for (or zero out) the direction-dependent propagation delay differences due to the spacing between antennas. The width of the autocorrelation mainlobe mentioned earlier determines the solid angle of the cone of near-perfect modulation alignments, or signal focusing, outside of which the signal replicas can be said to combine noncoherently, or to be defocused.

Just as hopping and commutation among spaced antennas can be used as described above to spread out the signal energy in spectrum, hopping and commutation between spaced antennas can be used to reassemble signal energy into a spectrally despread form. One embodiment of this method is to hop between a set of spaced antennas in such a way as to compensate for and hence eliminate phase jumps carried by an arriving or, for a particular direction, a departing wavefront. Other embodiments employ commutation among antennas arranged along a path of motion, possibly with nonuniform (and, for some purposes, variable/controllable) spacing between antennas, all designed to induce a frequency modulation that cancels out an a prior known or detectable frequency modulation on an incident signal. Indeed, the principles underlying signal modulation by switching or commutating among a set of spaced antennas, as described in this disclosure, can be applied to impart to an incident signal a modulation that cancels out any particular modulation component(such as frequency hopping, PSK, ASK, analog modulation) or some combination of modulations on that signal.

Up to this point in this disclosure, it has been presumed that the discrete time instants for abrupt switching are uniformly spaced, or the transit times for the antenna motion between consecutively Tapped antenna positions are equal. We refer to this type of switching/commutation as uniform. We now consider nonuniform switching/commutation.

The results of nonuniform switching/commutation can be modeled by forms of pulse-time modulation. As in the case of uniform switching or uniformcommutation,the output can be expressed as the response of a linear filter whose impulse response is the switching hold (for PSK) or blending (for IDFM) function, and whose input is the sequence of the time-position modulated impulse samples of $e^{j\psi(t)} \cdot e^{j\omega_c t}$.

In order to formulate expressions for the outcome of nonuniform switching/sampling, we first recognize that the effect of switching/commutation is to multiply the signal (either incident or emitted) by $e_{com}(t)$, where in the case of uniformly spaced switching/commutator samples $$e_{com}(t) = h_b(t) \left\{ e^{j\psi(t)} \sum_{n=-\infty}^{\infty} u_o(t - nT_s) \right\} \quad (10)$$

$$= h_b(t) \left\{ e^{j\psi(t)} \cdot \frac{1}{T_s} \sum_{n=-\infty}^{\infty} e^{jn\omega_s t} \right\},$$

$$\omega_s = 2\pi/T_s$$

where $h_b(t)$ is the blending function for IDFM, or the hold function for PSK switching; $e^{j\psi(t)}$ is the POM phase-shift factor; $u_o(t-nT_s)$ is the unit impulse at $t=nT_s$; $T_s$ is the time between consecutive samples (the hold time or bit duration for PSK); and $f_s = 1/T_s = \omega_s/2\pi$ is the sampling frequency for IDFM commutation. We can readily show that if the unit impulses are time-position modulated by a time function $e_m(t)$, then the resulting time-position-modulated (TPM) unit impulse train can be expressed as $$u_{o,pm}(t) = [1 - k\dot{e}_m(t)] \sum_{n=-\infty}^{\infty} u_o(t - nT_s - ke_m(t)) \quad (11)$$

$$= \frac{1}{T_s} [1 - k\dot{e}_m(t)] \sum_{n=-\infty}^{\infty} e^{jn\omega_s[t - ke_m(t)]}$$

Comparison of Eq.(6) with $$u_{o,T_s}(t) = \sum_{n=-\infty}^{\infty} u_o(t - nT_s) = \frac{1}{T_s} \sum_{n=-\infty}^{\infty} e^{jn\omega_s t} \quad (12)$$

shows that time-position modulation of impulses in a train
(a) may be accounted for by defining an instantaneous frequency of sampling $$\omega_{si}(t) \equiv \omega_s[1 - k\dot{e}_m(t)]$$

and an associated instantaneous-period of sampling $$T_{si} \equiv 2\pi/\omega_{si}(t)$$

in the Fourier expansion of the periodic impulse train, thus generalizing Eq. (12) into the form $$u_{o,pm}(t) = \frac{\omega_{si}(t)}{2\pi} \sum_{n=-\infty}^{\infty} e^{jn\int^t \omega_{si}(\xi)d\xi} \quad (13)$$

-continued $$= \frac{\mathfrak{A}(t)}{2\pi} \sum_{n=-\infty}^{\infty} e^{jn\theta_{si}(t)} \quad (14)$$

where $\theta_{si}(t)$ is the "instantaneous phase" of the sampling impulse train; and (b) is equivalent to envelope modulation by $\dot{e}_m(t)$ and phase modulation by $e_m(t)$ of each of the sinusoidal components of the periodic train with a peak phase deviation that is proportional to the harmonic order of the component.

On the basis of (a) and Eq. (14), a train of position-modulated impulses may be considered as a frequency or phase-modulated impulse carrier having an instantaneous frequency that defines an instantaneous frequency of sampling. Thus, an impulse train, like a sinusoidal carrier, may be said to possess an "instantaneous weight," an "instantaneous frequency" and an "instantaneous phase" each of which can be modulated.

Figure 7A:
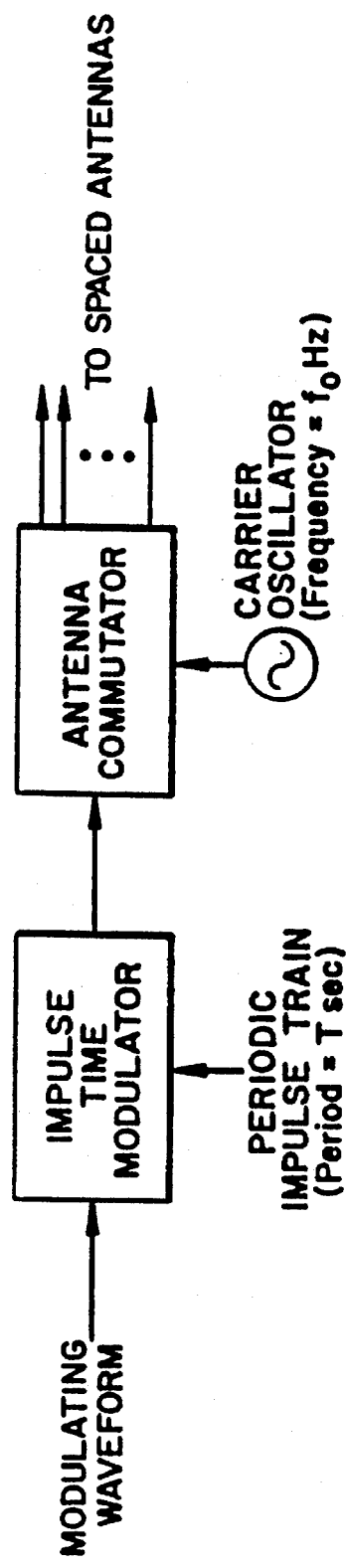
FIGS. 7 a) and b) are schematic illustrations of embodiments of the present invention for generating frequency modulated signal waves that are characterized by carrier frequencies which may be independently controlled to satisfy any prescribed specifications on frequency value and/or stability.
Figure 7B:
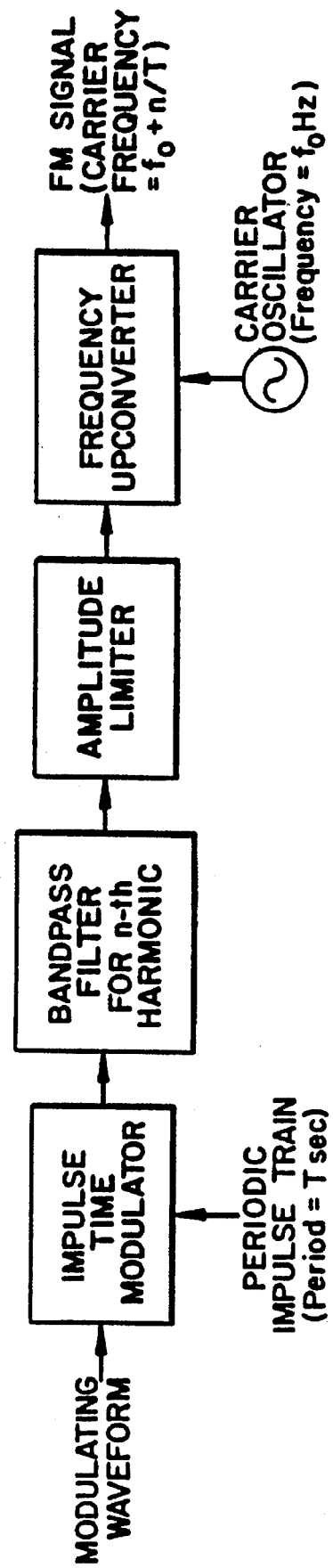

Nonuniform timing between phase jumps, and of transit time between consecutively connected antennas, may be prearranged for either by the design of the spacing between antennas, or by employing a phase-modulated timing clock for controlling the commutation, as illustrated in FIG. 7 a), or by a combination of both.

FIG. 7 b) illustrates a method of generating a frequency-modulated signal wave of unrestricted frequency-modulation index, characterized by carrier frequencies which may be independently controlled to satisfy any prescribed specifications on frequency value and/or frequency stability, based on the use of a phasermodulated periodic train of very short pulses, as expressed in Eqs. (11) and(13) and (14), in conjunction with an oscillator that satisfies the specified tolerance on frequency instability. With reference to FIG. 7 b), note that the IMPULSE-TIME MODULATOR block generates a time-modulated impulse train expressed mathematically in Eqs. (13) and (14). Each of the terms in the series expansions in Eqs. (13) and (14) represents a signal with both amplitude and frequency modulations. One of these terms, designated as the n-th harmonic in FIG. 7 b) in an exemplary illustration, is isolated by the BANDPASS FILTER block in FIG. 7 b) and delivered in the output of this filter. The value of n chosen in the design of the BANDPASS FILTER can be the harmonic considered by the designer to provide a desired value of FM modulation index. The amplitude modulation of the selected n-th harmonic signal is then suppressed by the AMPLITUDE LIMITER block in FIG. 7 b) to obtain the desired constant-envelope frequency modulated signal, which is finally unconverted to the desired center frequency by the FREQUENCY UPCONVERTER block in FIG. 7 b).

While there has been described what is at present considered to be representative embodiments of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A method for frequency modulating a carrier wave having an independently controlled carrier frequency, comprising the steps of:

establishing a desired modulating wave;

establishing a source of periodically recurring very low-duty-cycle pulses, having a specified repetition frequency and a specified tolerance on frequency stability;

establishing a sinusoidal carrier signal of specified frequency and tolerance on frequency stability;

effecting modulation of times of occurrence of said recurring pulses by causing said times of occurrence to be shifted, by samples of said modulating waveform, from their positions of periodic recurrence, resulting in a time-positioned modulated (TPM) pulse sequence;

filtering frequency band centered periodically recurring pulses to provide a selected component of said TPM pulse sequence;

suppressing amplitude modulation of said selected component to provide a constant-amplitude replica of it; and employing said sinusoidal carrier to effect translation of center frequency of said constant-amplitude replica of selected component to the desired radio frequency channel.

2. An apparatus for frequency modulating a carrier wave having an independently controlled carrier frequency, comprising:

a source of a desired modulating wave;

a source of periodically recurring pulses having a specified repetition frequency and a specified tolerance on repetition frequency stability;

a source of a sinusoidal carrier signal of specified frequency and tolerance on frequency stability;

means for effecting modulation of times of occurrence of recurring pulses by causing said times of occurrence to be shifted, by samples of said modulating waveform, from their positions of periodic recurrence, resulting in a time-position modulated (TPM) pulse sequence;

bandpass filter means for selecting a frequency band centered at a prescribed harmonic of the repetition frequency of said periodically recurring pulses, resulting in a selected component of said TPM pulse sequence;

means for suppressing amplitude modulation of said selected component, resulting in a constant-amplitude replica of it; and means for employing said sinusoidal carrier to effect translation of center frequency of said constant-amplitude replica of selected cemponent to the desired radio frequency channel.

3. A method for demodulating a signal wave having a constant envelope with a frequency/phase modulation, comprising the steps of:

time differentiating said signal wave;

suppressing the amplitude modulation (AM) of the time differentiated signal wave;

time-delay compensating the result of one of either the time differentiated signal wave or the AM suppressed signal wave to equalize the time delays incurred in both of said steps;

multiplying the time-delay compensated result with the result of the other of said time differentiated signal wave or the AM suppressed signal wave; and lowpass filtering the result of said multiplying step to obtain an FM baseband (or modulating) waveform.

4. An apparatus for demodulating a signal wave having a constant envelope and a frequency/phase modulation comprising:

means for time differentiating said signal wave;

means for suppressing the amplitude modulation (AM) of an output of said means for time differentiating;

means for time-delay compensating the output of the means or an output of the suppressing means to equalize the time delays introduced by said differentiating means and said suppressing means;

means for multiplying the delay-compensated output with the output of the suppressing means or the differentiating means, respectively; and means for lowpass filtering an output of said multiplying means to obtain an FM baseband (or modulating) waveform.

5. A method for demodulating a signal wave having a constant envelope and a frequency/phase modulation, comprising the steps of:

delaying said signal wave in two successive equal delay steps, to obtain a time-advanced and a time-retarded replica of said signal wave relative to an output of a first delay step of said two successive equal delay steps;

obtaining a difference between said time-advanced and time-retarded replicas of said signal wave;

multiplying the result of said first delay step and the result of said step for obtaining the difference; and lowpass filtering the result of said multiplying step to obtain an FM baseband (or modulating) waveform.

6. The method of claim 5 wherein said step for delaying said signal wave employs three antennas arranged with uniform spacing along a straight line, the first antenna yielding the time-advanced replica and the third yielding the time-retarded replica of the incident signal wave relative to an output of a center antenna, and the output of the center antenna serves as the result of said first delay step.

7. An apparatus for demodulating a signal wave having a constant envelope with a frequency/phase modulation, comprising:

means for delaying said signal wave in two successive equal delay steps, to obtain a time-advanced and a time-retarded replica of said signal wave relative to an output of a first delay step of said two successive equal delay steps;

means for obtaining a difference between said time-advanced and time retarded replicas of said signal wave;

means for multiplying the output of said first delay means and the output of said difference means; and means for lowpass filtering the output of said multiplying step to obtain an FM baseband (or modulating) waveform.

8. The apparatus of claim 7 wherein said means for delaying said signal wave comprises three antennas arranged with uniform spacing along a straight line, the first antenna yielding the time-advanced replica and the third antenna yielding the time-retarded replica of the incident said signal wave relative to the output of a center antenna, and the output of said center antenna serves as the output of said first delay step.

* * * * *